United States Patent [19]

Olson

[11] 4,063,745
[45] Dec. 20, 1977

[54] TRAILER FOR FARM MACHINERY

[76] Inventor: LeRoy C. Olson, Box 707, LaMoure, N. Dak. 58458

[21] Appl. No.: 622,055

[22] Filed: Oct. 14, 1975

[51] Int. Cl.² ............................................. B62D 21/18
[52] U.S. Cl. ............................... 280/43.23; 280/43.24; 214/506
[58] Field of Search ............... 280/43.23, 43.24, 43.17, 280/81 R, 104, 105.5, 408; 214/506, 505

[56] References Cited

U.S. PATENT DOCUMENTS

| | | | |
|---|---|---|---|
| 2,333,853 | 11/1943 | Fellabaum | 280/408 |
| 2,502,309 | 3/1950 | Byrd | 280/43.23 |
| 2,519,022 | 8/1950 | Stemen | 280/43.23 |
| 2,823,047 | 2/1958 | Hutchinson | 280/408 |
| 3,035,728 | 5/1962 | Hecker | 280/43.23 |
| 3,179,271 | 4/1965 | Donahue | 214/506 |
| 3,271,042 | 9/1966 | Flodin | 280/43.23 |
| 3,517,944 | 6/1970 | Hage | 280/43.23 |
| 3,578,352 | 5/1971 | Heine | 280/43.23 |
| 3,866,935 | 2/1975 | Nelson | 280/43.23 |

Primary Examiner—Robert R. Song
Attorney, Agent, or Firm—Merchant, Gould, Smith, Edell, Welter & Schmidt

[57] ABSTRACT

A trailer construction in which the trailer bed is articulated into a plurality of sections for relative pivotal movement about one or more transverse horizontal axes, and which includes means for temporarily lowering the bed of the trailer to rest directly on the ground, for unimpeded loading by movement transverse of the bed, longitudinal loading from behind still being available as well.

2 Claims, 6 Drawing Figures

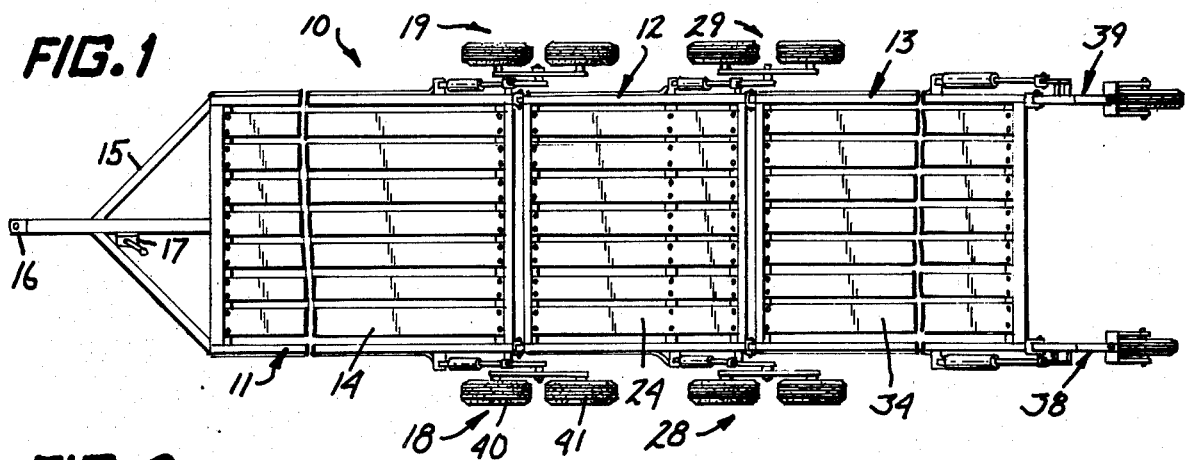
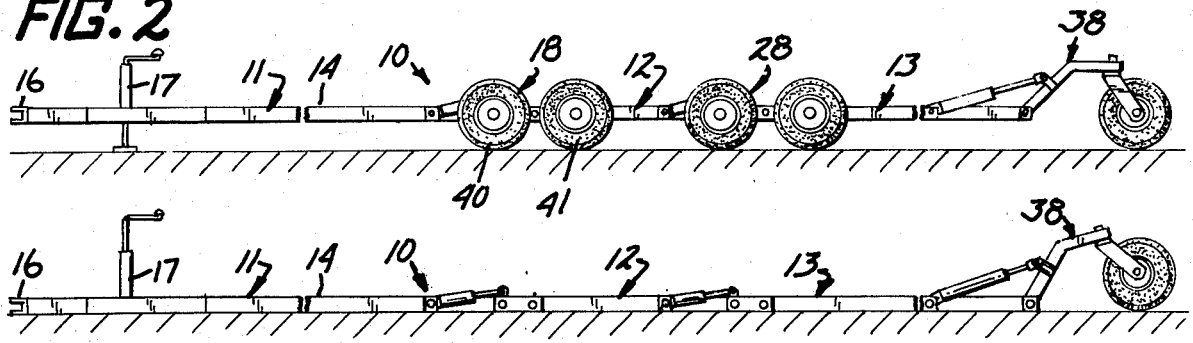
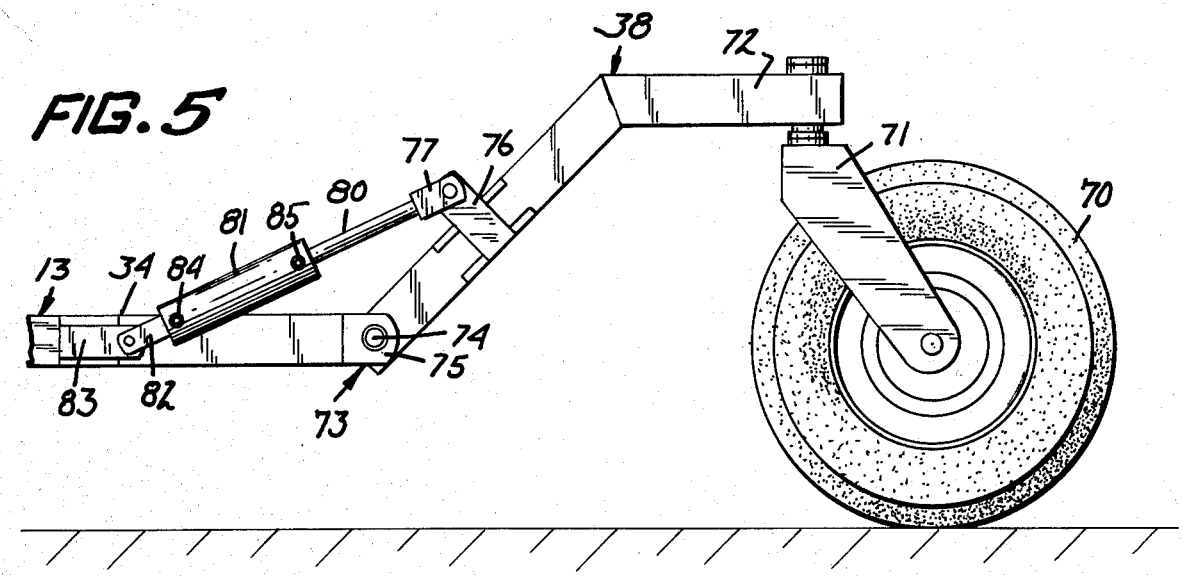

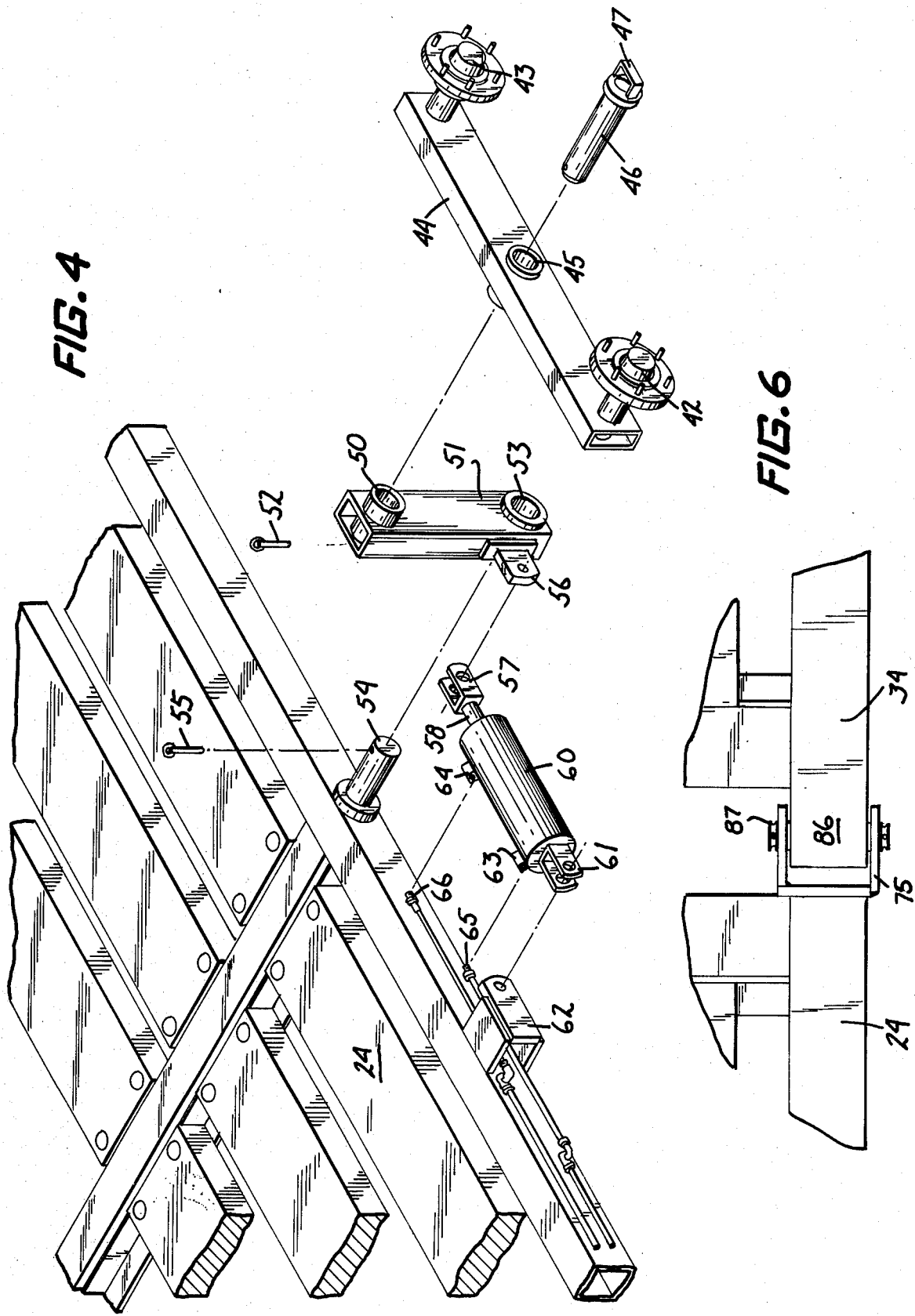

TRAILER FOR FARM MACHINERY

BACKGROUND OF THE INVENTION

This invention relates to the field of transportation, and particularly to trailers to be towed behind draft vehicles to transport bulky loads such as commercial farm machinery. While such machinery is of course wheeled, for movement over the ground in performing its normal function, the construction is such that no reasonable highway speed can be obtained from the vehicle on its own wheels, and when such a machine is initially delivered, transferred to a different owner, or even moved from place to place in a single large farm complex, it is customary as well as necessary for efficiency to load the machine in a vehicle designed for highway use.

Trailers of many kinds are known, and have in common a load carrying bed or body, running gear in the form of single or multiple wheels, and rigging such as a tow bar for coupling the trailer to a draft vehicle. There are of course size limitations, particularly as to the width of such a trailer, when it is used on the public highways, and much large scale farm equipment, such as grain drills for example, is too wide to be moved down the highway in its normal direction, but must be moved sideways. This in turn has presented difficulties in loading a trailer from the rear end as is traditional.

It is also true that a vehicle useful for highway transport may not be satisfactory in the first and last few thousand yards of the journey, which are typically over farmland rather than highway. On such land, the line through the trailer, trailer hitch, and the draft vehicle does not remain straight, but angulates more or less sharply at the hitch as the assembly moves over the crests and dips of rolling country. A unitary trailer bed long enough to transport larger commercial machinery experiences considerable rocking motion under these conditions, and may even drag at the front or rear if conditions are severe.

SUMMARY OF THE INVENTION

My invention is a trailer which obviates or mitigates the difficulties outlined above. It comprises a vehicle having a body or bed which is articulated to permit more easy travel over uneven country. It is capable of rear loading as usual, but also is arranged with wheel supports which are hydraulically adjustable to lower the bed of the trailer to the ground, after which the wheels on one or both sides may be removed and a long load may be rolled unimpeded onto the bed of the tractor from the side, reverse procedure resulting in the load being raised to traveling height. For extremely long loads, I provide caster wheels at the rear corners of the bed, and they also partake of the hydraulic lowering and raising feature.

Various advantages and features of novelty which characterize my invention are pointed out with particularity in the claims annexed hereto and forming a part hereof. However, for a better understanding of the invention, it advantages, and objects attined by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, FIG. 1 is a plan view of a large articulated trailer according to the invention;

FIG. 2 is a side view of the trailer in its highway mode;

FIG. 3 is a side view of the trailer in its loading mode;

FIG. 4 is an exploded view of running gear for my invention;

FIG. 5 is a detailed showing of my caster wheel structure; and

FIG. 6 is a detailed plan view of an articulated joint between bed sections of my trailer.

DESCRIPTION OF THE PREFERRED EMBODIMENT

My trailer is shown in FIGS. 1-3 to include an articulated body or bed 10 including a front section 11, an intermediate section 12, and a rear section 13, although it will be evident that more or fewer sections may be used if desired. Front section 11 includes a bed 14, coupler rigging in the form of a tow bar 15 including a hitch 16 and a outboard support jack screw 17, and left and right running gear 18 and 19. Intermediate section 12 includes a bed 24 and left and right running gear 28 and 29. Rear section 13 includes a bed 34 and left and right running gear 38 and 39. The sections are interconnected by articulation means described below to form a unitary transportation vehicle which is yet capable of some change in configuration to follow the surface of uneven land.

Running gear 18, 19, 28 and 29 are all alike and will be described only once as specifically applied to gear 18. A front wheel 40 and rear wheel 41 are mounted in suitable bearings on stub axles 42 and 43 (see FIG. 4) located near the ends of a "walking beam" 44. At the center, beam 44 is provided with a bearing 45 through which passes a pivot pin 46 having a handle 47 at its outer end. Pin 46 passes through a second bearing 50 in a crank arm 51, and is held in place therein by any suitable means such as a cotter key 52. Arm 51 carries a bearing 53 by means of which it is rotatably mounted on a fixed pivot 54 secured to bed 24 in any appropriate manner, and is held on the pivot by means such as a second cotter key 55.

Arm 51 includes a laterally projecting ear 56, arranged for connection by a clevis 57 to the piston 58 of a hydraulic cylinder 60 connected at its other end, by a clevis 61, to a bracket 62 suitably mounted on frame 24. Connections 63 and 64 for hydraulic fluid are provided at cylinder 60, and are connected to hydraulic lines 65 and 66 of suitable flexible tubing.

Running gear 38 and 39 are also alike in structure, although they differ from the structure just described. As shown in FIG. 5, gear 38 includes a wheel 70 castered as at 71 in one end of a crank arm 72 pivoted at 73 to the rear end of bed 34 at one of its edges by a pin 74 extending transversely through a clevis 75 fixed to the frame. Arm 72 includes an ear 76 pivotally connected by a clevis 77 to the piston 80 of a hydraulic cylinder 81. The cylinder in turn is pivoted by a clevis 82 to a bracket 83 suitably secured to bed 34. Hydraulic connections for cylinder 81 are shown at 84 and 85.

I resort to gear 38 and 39 instead of replicating gear 18 and 19 at the rear of the trailer because of the trailer's length. The rear-most wheels of such a vehicle are so far from the normal center of turn, approximately the middle of bed 24, that unacceptably large lateral forces would act on the wheels during any but the most gradual of turns. By castering the rear wheels, these effects are obviated, while the space for rearward access to the bed is not unduly restricted.

FIG. 6 gives a detailed showing of how the trailer beds are articulated. A clevis 75 is secured to the rear corner of each edge of each bed section, those for the rear section being used for running gear 38,39 as just described. An ear 86 is secured to the front corner of each edge of the intermediate and rear bed sections. Each clevis and ear are bored to receive a removable pivot pin 87. The pins at each end of the trailer are aligned on a common transverse axis, about which relative pivotal movement between the bed sections can take place.

It will be apparent that when when a pistons 58 are hydraulically extended, crank arms 51 connected thereto rotate in a clockwise direction about pivot 53, acting through beams 44 to force wheels 40 and 41 against the ground and lift the side of bed 10 to the position shown in FIG. 2. Similarly, when pistons 80 are hydraulically extended, crank arms 72 connected thereto rotate in a clockwise direction about pins 74, forcing castor wheels 70 against the ground to lift the rear end of bed 10 to the position shown in FIG. 2. In use the trailer is tranported to the vicinity of the intended load, parked, and uncoupled from the traction vehicle. Jack screw 17 is actuated to lower tow bar 15, and hydraulic fluid is supplied to the cylinders to draw the pistons into the cylinders. This causes counterclockwise rotation of the crank arms, allowing the bed sections to sink into contact with the ground, whereafter further hydraulic operation raises the wheels out of contact with the ground. Pins 47 may now be removed so that beams 44 and the wheels may be removed and laid aside. By reverse operation of the hydraulic cylinders, crank arms 51 are rotated to a horizontal position where they do not project upwardly to any significant amount. If this option is exercised, the hydraulic lines to cylinders 60 should be controllable separately from those to cylinders 81.

Access to the entire side of the articulated trailer is now readily available, and the load to be transported, for example a twenty feeder grain drill, is drawn onto the bed. If desired, the wheels on both sides of the trailer may be removed, and the tractor drawing the drill may proceed directly across the trailer, thus easily positioning the implement where desired.

When loading has been accomplished, crank arms 51 are again raised, walking beams 44 and wheels 40 and 41 are reapplied, and cylinders 60 and 81 are energized to rotate arms 51, 72 clockwise, raising the load and returning the trailer to its condition shown in FIG. 1. Tow bar 15 is raised by jack screw 17 and the trailer is coupled to the draft vehicle. After such tie-downs as are necessary have been applied, the loaded trailer may be drawn away. Minor inequalities in the ground are compensated for by walking beams 44. For larger inequalities, the sections of the bed may pivot relative to one another at 75,86 as the exigencies may demand.

The foregoing description should not be read as excluding my trailer from use by rear loading when this is more convenient. The fact that the bed can be lowered to the ground makes such rear loading easier than where a more primitive loading arrangement such as a ramp, for example, is provided.

From the foregoing, it will be evident that I have invented a new and useful trailer structure in which a trailer bed of considerable length is articulated for more successful travel off the highway, and in which means are provided for lowering the tractor bed to direct contact with the ground to receive a long load by movement transverse of the trailer bed.

Numerous characteristics and advantages of my invention have been set forth in the foregoing description, together with details of the structure and function of the invention, and the novel features thereof are pointed out in the appended claims. The disclosure, however, is illustative only, and changes may be made in detail, especially in matters of shape, size and arrangement of parts, within the principle of the invention, to the full extent indicated by the broad general meaning of the terms in which the appended claims are expressed.

What is claimed is:

1. In a trailer, in combination:

a flat bed;

transverse pivot means extending outwardly from the side of said bed;

crank arms carried at first ends by said pivot means for pivotal movement between first positions, in which said arms extend at a right angle to said bed, and second positions, in which said arms lie along said bed without projecting materially above or below it;

further means removably mounting wheels on said crank arms, for movement therewith about said pivot means through a range having a vertical component at least as great as the normal height of said bed above the ground, said further means including beams centrally pivoted to the crank arm, and axle means carried by said beams and oppositely spaced from the central pivot for supporting a plurality of wheels for tandem operation;

and hydraulic motor means connected to said bed and said crank arms for causing the pivotal movement of said crank arms between said first position, in which said bed rests on the ground and said wheels are out of contact with the ground, and said second position, in which said wheels engage the ground, and said bed is at a desired height above the ground, wherein said further means includes a readily releasable connection for facilitating beam and wheel removal when said crank arms are in said first position.

2. Apparatus according to claim 1 in which said bed comprises a plurality of sections in end-to-end relation and means articulating said sections longitudinally for relative pivotal movement about at least one transverse horizontal axis, and in which a plurality of said transverse pivots extend outwardly from opposite sides of at least one of said sections of said bed at locations adjacent to the articulating means.

* * * * *